US012657034B2

(12) United States Patent
Kotary et al.

(10) Patent No.: US 12,657,034 B2
(45) Date of Patent: Jun. 16, 2026

(54) FIRMWARE ACCESS AGENT FOR COMPUTING DEVICE

(71) Applicant: Microsoft Technology Licensing, LLC, Redmond, WA (US)

(72) Inventors: Karunakara Kotary, Redmond, WA (US); Venkatesh Ramamurthy, Redmond, WA (US); Ankur Garg, Vancouver, WA (US); Nagasubramanian Gurumoorthy, Leander, TX (US); Andrew Richard Putnam, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 312 days.

(21) Appl. No.: 18/468,353

(22) Filed: Sep. 15, 2023

(65) Prior Publication Data

US 2025/0094177 A1 Mar. 20, 2025

(51) Int. Cl.
*G06F 9/4401* (2018.01)
*G06F 13/42* (2006.01)

(52) U.S. Cl.
CPC .......... *G06F 9/4403* (2013.01); *G06F 9/4416* (2013.01); *G06F 13/4282* (2013.01); *G06F 2213/0026* (2013.01)

(58) Field of Classification Search
CPC ...... G06F 3/123; G06F 9/4403; G06F 9/4405; G06F 9/4416; G06F 9/44505; G06F 12/0806; G06F 13/12; G06F 13/128; G06F 13/4282; G06F 2213/0026
See application file for complete search history.

(56) References Cited

U.S. PATENT DOCUMENTS

| | | | | |
|---|---|---|---|---|
| 7,908,470 B1 * | 3/2011 | Cavanna | ............... | G06F 9/4405 |
| | | | | 717/169 |
| 10,282,251 B2 * | 5/2019 | Gusev | ................... | G06F 11/106 |
| 10,496,565 B2 * | 12/2019 | Enamandram | .......... | G06F 9/445 |
| 11,038,966 B1 * | 6/2021 | Repetti | ................. | H04L 67/125 |
| 11,204,781 B2 * | 12/2021 | Gorecha | ............... | G06F 9/5016 |
| 2006/0015781 A1 * | 1/2006 | Rothman | ............ | G06F 11/2028 |
| | | | | 714/100 |

(Continued)

FOREIGN PATENT DOCUMENTS

WO      WO-2022272191 A1 * 12/2022 ........... G06F 9/4401

OTHER PUBLICATIONS

Zhang, Yang. "Dynamic Cache Partitioning for Multi-Core Systems". 2014. Wright State University. (Year: 2014).*

(Continued)

*Primary Examiner* — Thomas J. Cleary
(74) *Attorney, Agent, or Firm* — Alleman Hall LLP

(57) ABSTRACT

A method for firmware access on a computing device includes, at a firmware access agent of the computing device, receiving a read request for firmware instructions from a hardware logic component of the computing device. The read request is generated as part of a boot sequence of the hardware logic component, and is received via a data interface communicatively coupling the hardware logic device and the firmware access agent. The firmware access agent retrieves the firmware instructions over a computer network from a remote firmware storage system separate from the computing device. The firmware instructions are provided to the hardware logic component via the data interface, such that the hardware logic component executes the firmware instructions and continues the boot sequence.

20 Claims, 6 Drawing Sheets

(56)                   References Cited

U.S. PATENT DOCUMENTS

| | | | |
|---|---|---|---|
| 2006/0020837 A1 | 1/2006 | Rothman | |
| 2006/0041882 A1* | 2/2006 | Shah | G06F 15/177 |
| | | | 717/176 |
| 2006/0288202 A1* | 12/2006 | Doran | G06F 9/4416 |
| | | | 713/2 |
| 2007/0061342 A1* | 3/2007 | Magdeburger | G06F 13/385 |
| 2007/0067614 A1* | 3/2007 | Berry, Jr. | G06F 8/60 |
| | | | 713/1 |
| 2009/0172471 A1* | 7/2009 | Zimmer | G06F 9/45541 |
| | | | 714/17 |
| 2013/0151829 A1* | 6/2013 | Amann | G06F 12/00 |
| | | | 713/2 |
| 2014/0082388 A1* | 3/2014 | Thevar | G06F 21/575 |
| | | | 713/1 |
| 2014/0149732 A1* | 5/2014 | Sanner, III | G06F 9/4403 |
| | | | 713/2 |
| 2015/0278068 A1 | 10/2015 | Swanson et al. | |
| 2016/0011878 A1* | 1/2016 | Chandra | G06F 12/0246 |
| | | | 711/103 |
| 2017/0185781 A1* | 6/2017 | Kim | G06F 8/65 |
| 2018/0095740 A1 | 4/2018 | Kotary | |
| 2019/0108347 A1 | 4/2019 | Ghetie | |
| 2020/0057656 A1* | 2/2020 | Liu | G06F 9/4411 |
| 2020/0301598 A1* | 9/2020 | Yamazaki | G06F 11/26 |
| 2021/0042035 A1* | 2/2021 | Futagi | G06F 11/1417 |
| 2023/0060908 A1* | 3/2023 | Wang | G06F 9/4408 |
| 2024/0160431 A1* | 5/2024 | Kumar | G06F 8/65 |
| 2024/0272911 A1* | 8/2024 | Krithivas | G06F 9/4403 |
| 2024/0378061 A1* | 11/2024 | Colenbrander | H04L 41/0816 |

OTHER PUBLICATIONS

International Search Report and Written Opinion received for PCT Application No. PCT/US2024/042593, Oct. 31, 2024, 18 pages.

* cited by examiner

FIRMWARE ACCESS AGENT FOR COMPUTING DEVICE

BACKGROUND

Computing devices typically include various on-board logic components that execute firmware instructions during boot. Such instructions may include, for instance, a motherboard BIOS, firmware for a baseboard management controller, firmware for a discrete logic card such as a graphics processor, etc. The firmware instructions for each logic component are often stored in and retrieved from corresponding on-board flash memory chips, such as serial peripheral interface (SPI) flash memory chips.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

The present disclosure generally describes methods for firmware access for hardware logic components of a computing device. Specifically, the computing device includes a firmware access agent that receives a read request for firmware instructions from a hardware logic component. The read request is generated as part of a boot sequence of the hardware logic component, and is received via a data interface communicatively coupling the hardware logic device and the firmware access agent. The firmware access agent retrieves the firmware instructions over a computer network from a remote firmware storage system separate from the computing device. The firmware instructions are provided to the hardware logic component via the data interface, such that the hardware logic component executes the firmware instructions and continues the boot sequence.

DETAILED DESCRIPTION

Figure 1:
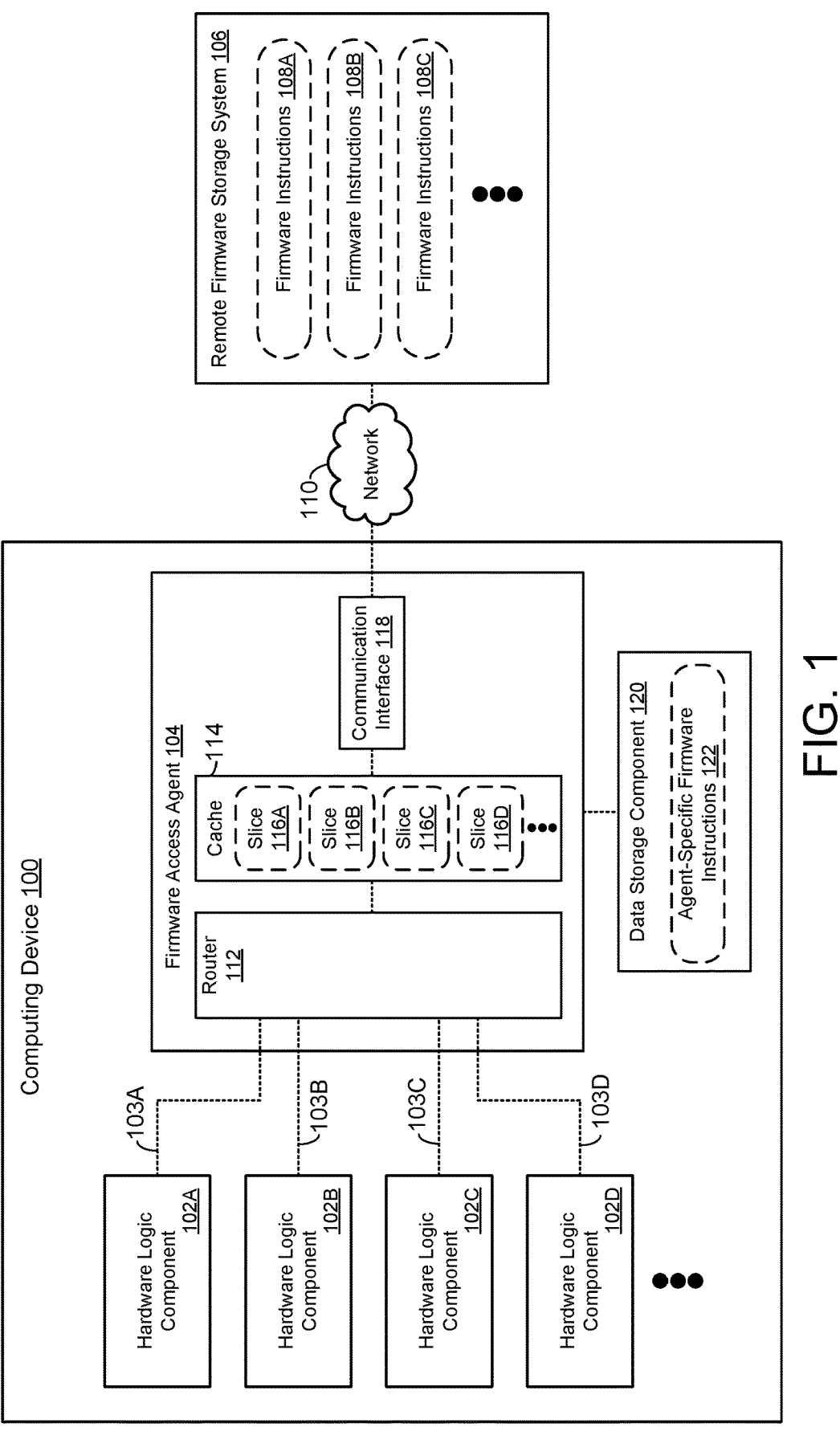
FIG. 1 schematically shows aspects of an example computing device and remote firmware storage system.

A computing device typically includes multiple hardware logic components that execute firmware instructions. These can include, as examples, a central processing unit (CPU), a baseboard management controller (BMC), a discrete accelerator card (e.g., graphics processor), root of trust hardware, etc. As one non-limiting example, a hardware logic component may be implemented as logic subsystem 502 described below with respect to FIG. 5. The present disclosure uses the terms "firmware" and "firmware instructions" interchangeably, and each refer to the low-level software code or microcode used to control behavior of computer hardware.

Firmware instructions executed by a particular hardware logic component are typically stored in different corresponding on-board storage devices, such as flash memory chips. In a common scenario, the firmware instructions for a particular hardware logic component are retrieved from corresponding non-volatile flash memory via a serial peripheral interface (SPI) bus, or other suitable data interface. However, such on-board storage of firmware instructions can pose various problems. For instance, it can be difficult and time consuming to update the locally stored firmware, often requiring the computing device to be taken offline, which creates downtime and negatively affects the user experience. Furthermore, on-board storage of firmware instructions can introduce security risks. For instance, it is not always possible to trust that the firmware preinstalled on a particular component has not been tampered with by a malicious actor at some point along the supply chain.

Accordingly, the present disclosure is directed to techniques for firmware access, in which a firmware access agent of a computing device serves as an intermediary between a remote firmware storage system and one or more hardware logic devices of the computing device. When a hardware logic component attempts to read firmware (e.g., as part of a boot sequence), the read request is handled by the firmware access agent instead of an on-board flash memory chip. The firmware access agent retrieves the corresponding firmware instructions from the remote firmware storage system, which is separate from the computing device, and provides the firmware to the hardware logic component.

The hardware logic component and firmware access agent are communicatively coupled via a data interface. In some examples, the data interface takes the form of an SPI bus, or other suitable data interface by which the hardware logic component would ordinarily access firmware instructions from an on-board flash memory chip. This beneficially alleviates a need to specially configure the hardware logic component for use with the firmware access agent. In other words, from the perspective of the hardware logic component, the firmware instructions are requested and received over the data interface just as would occur if the firmware was stored in on-board flash memory.

In this manner, the firmware instructions executed by a particular hardware logic component are retrieved from a trusted source, rather than stored locally on-board. This beneficially improves the security of the computing device by alleviating the risk that the firmware could have been compromised by a malicious actor. Additionally, remote access of firmware as described herein facilitates easier firmware updates, as an updated firmware package can be added to the remote firmware storage system and propagated out to one or more computing devices serviced by the storage system.

The techniques described herein potentially enable omission of several flash memory chips that would ordinarily be included in a typical computing device. This beneficially reduces the total cost and power consumption of the computing device without significantly impacting performance. Furthermore, on-board flash memory chips have relatively limited data storage space. By contrast, the total storage capacity of the remote firmware storage system can be arbitrarily large, providing much greater total capacity for storing different sets of firmware instructions corresponding to different hardware logic components and/or different types of computing devices.

FIG. 1 schematically shows an example computing device 100 usable to implement any or all of the firmware access techniques described herein. It will be understood that a "computing device" has any suitable capabilities, hardware configuration, and form factor. As non-limiting examples, a computing device may be implemented as a server computer, desktop computer, laptop computer, mobile computing device, or any other suitable computing device. In some examples, computing device 100 is implemented as computing system 500 described below with respect to FIG. 5.

Computing device 100 of FIG. 1 includes several hardware logic components 102A-102D. In general, a computing device includes one or more hardware logic components configured to execute firmware instructions. As discussed above, non-limiting examples of hardware logic components include a central processing unit (CPU), baseboard management controller (BMC), discrete accelerator card (e.g., graphics processor), root of trust hardware, etc.

Computing device 100 additionally includes a firmware access agent 104. The firmware access agent is implemented as any suitable combination of one or more logic components usable to receive firmware requests, interpret such requests, and communicate with a remote firmware storage system. As one non-limiting example, the firmware access agent may be implemented as, or otherwise include a network interface controller. Additionally, or alternatively, the firmware access agent may be implemented as any suitable combination of the logic subsystem, storage subsystem, and/or communication subsystem described below with respect to FIG. 5.

In the example of FIG. 1, firmware access agent 104 is communicatively coupled with hardware logic component 102A via a corresponding data interface 103A. It will be understood that, in some examples, a computing device may include two or more hardware logic components. For instance, in FIG. 1, four different hardware logic components are schematically represented. In such cases, each of the two or more hardware logic components may be communicatively coupled with the firmware access agent via different respective data interfaces. In FIG. 1, the different hardware logic components 102A-D are communicatively coupled with the firmware access agent via corresponding data interfaces 103A-D.

As used herein, a "data interface" takes the form of any suitable bus or communication channel over which a hardware logic component can exchange data with a firmware access agent. As described above, in one non-limiting example, a "data interface" takes the form of an SPI bus. As additional non-limiting examples, a data interface may be implemented as any of an enhanced serial peripheral interface (eSPI) bus, a NAND flash interface, or a peripheral component interconnect express (PCIE) interface.

The present disclosure describes the firmware access agent as receiving a "read request" for firmware instructions from a hardware logic component via a data interface. It will be understood that a read request for firmware instructions takes any suitable form. As one non-limiting example, when a hardware logic component first begins its boot sequence it may automatically output a predefined data address on the data interface, which ordinarily would correspond to the first line of the firmware instructions as stored on corresponding on-board flash memory. For instance, the predefined data address may be hardcoded in the hardware logic component, such that it is always output when the hardware logic component is first powered on. In such examples, the firmware access agent recognizes the predefined data address output on the data interface, interprets the data address as a read request for firmware instructions, and retrieves corresponding firmware from the remote firmware storage system.

Alternatively, it will be understood that a "read request" for firmware instructions may take any other suitable form depending on the implementation. Furthermore, data communication between the hardware logic component and firmware access agent need not be restricted only to firmware read requests and responsive firmware instructions provided by the firmware access agent. Rather, in some examples, the hardware logic component may transmit firmware write and/or erase requests to the firmware access agent in addition to, or instead of, read requests. Each of the read requests, write requests, and/or erase requests take any suitable form depending on the specific implementation.

FIG. 1 additionally shows a remote firmware storage system 106 communicatively coupled to computing device 100. The remote firmware storage system stores one or more sets of firmware instructions, corresponding to one or more hardware logic components of the computing device. For instance, in FIG. 1, the remote firmware storage system stores a set of firmware instructions 108A corresponding to hardware logic component 102A of computing device 100. In cases where the computing device includes two or more different hardware logic components, then the remote firmware storage system may store separate sets of firmware instructions for each of the two or more hardware logic components. In FIG. 1, the remote firmware storage system additionally stores firmware instructions 108B and 108C.

In general, a firmware storage system takes the form of any computing device or set of one or more hardware components suitable for storing firmware instructions, and making such firmware instructions accessible to the firmware access agent of the computing device. Furthermore, the firmware access agent exchanges data with the remote firmware storage system in any suitable way, using any suitable communication modality.

In some examples, the remote firmware storage system takes the form of a discrete computing device, such as a server computer, that stores firmware instructions for one or more other computing devices. For instance, in one example, computing device 100 is one compute node of a plurality of compute nodes in a data center, and the remote firmware storage system takes the form of a server that stores sets of firmware instructions accessible to other compute nodes in the data center.

In some examples, the computing device and remote firmware storage system communicate over a computer network, such as a local-area network or wide-area network. For instance, the computing device and remote firmware storage system may communicate via the Internet. In the example of FIG. 1, firmware access agent 104 and remote firmware storage system 106 communicate over a computer network 110—in other words, in this example, the firmware access agent retrieves firmware instructions from the remote firmware storage system over a computer network.

As another example, the remote firmware storage system may be implemented as an external storage device or array communicatively coupled with the computing device. In other words, the remote firmware storage system need not be implemented as an entire computing device that runs arbitrary software instructions, but rather may be implemented as remote storage capacity accessible to one or more computing devices over a suitable communication interface.

In the example of FIG. 1, the firmware access agent is communicatively coupled with multiple different hardware logic components 102A-D via different corresponding data interfaces 103A-D. It will be understood that in other examples, one or more hardware logic components may share a common data interface connection with the firmware access agent. In any case, the firmware access agent distinguishes between firmware requests received from the various hardware logic components in any suitable way. In FIG. 1, the firmware access agent 104 includes a router 112 that functions to receive firmware requests from the various different hardware logic components, and route the firmware requests to downstream aspects of the firmware access agent as needed. For instance, upon receiving a firmware request, the router may decode the transaction type (e.g., read, write, erase) of the firmware request, a memory address targeted by the firmware request, an identifier of the hardware logic component over which the request is received, etc.

In cases where each hardware logic component has its own corresponding data interface, then the requests received from the different logic components are in some embodiments distinguished based at least in part on the data interfaces over which the requests are received. In other words, each data interface may be associated with its own respective interface identifier. As one example, the interface identifier may correspond to one or more physical pins of the firmware access agent to which the data interface is connected. When the firmware access agent receives a read request over a data interface having a particular interface identifier (e.g., pin number), it retrieves the firmware instructions corresponding to the interface identifier from the remote firmware storage system.

In cases where two or more hardware logic components share the same data interface, then requests transmitted by the different logic components may be distinguished in another suitable way. For instance, requests originating from different hardware logic components may specify different identifier codes. Additionally, or alternatively, requests originating from different hardware logic components may be distinguished based on the data addresses targeted by the requests—e.g., different hardware logic components may be assigned different address ranges.

The present disclosure primarily focuses on scenarios where the firmware access agent receives a firmware read request, and then retrieves corresponding firmware instructions from the remote firmware storage system. In some embodiments, however, the firmware access agent includes a local cache used to store firmware instructions previously retrieved from the remote firmware storage system. In the example of FIG. 1, firmware access agent 104 includes a cache 114. In this manner, the firmware access agent need not retrieve firmware instructions from the remote firmware storage system in response to every read request, but rather in some cases provides a previously cached copy of the firmware instructions. As such, in some cases, a requested set firmware instructions are only retrieved from the remote firmware storage system after a determination by the firmware access agent that the firmware instructions are not already stored in the cache (e.g., a "cache miss").

The cache may be implemented using any suitable volatile or non-volatile computer storage hardware. As one non-limiting example, the cache may be implemented as dynamic random-access memory (DRAM) integrated into, or communicatively coupled to the firmware access agent. In some examples, the cache is implemented as storage subsystem 504 described below with respect to FIG. 5.

In some examples, the cache of the firmware access agent is organized as two or more cache slices used for caching firmware instructions corresponding to two or more hardware logic components of the computing device. In the example of FIG. 1, cache 114 includes cache slices 116A-116D, which correspond to hardware logic components 102A-102D. The cache may be divided into different cache slices in any suitable way. For instance, different cache slices may be divided logically (e.g., as different address ranges) and/or physically (e.g., as different distinct data storage components).

Firmware access agent 104 additionally includes a communication interface 118. The communication interface serves to exchange data between the firmware access agent and remote firmware storage system. For instance, the communication interface may interpret the type of firmware request received (e.g., as decoded by the router 112) and translate, packetize, or otherwise convert the request into a format that is deliverable over whichever communication modality is used to exchange data between the firmware access agent and remote firmware storage system (e.g., computer network). In one example, a firmware read request is received by the firmware access agent via an SPI bus, then translated into one or more network data packets (or frames) for transmission via a network communication stack.

In any case, any data transmitted by the firmware access agent to the remote firmware storage system requesting firmware instructions may be formatted in any suitable way, and specify the requested firmware instructions in any suitable way. As one example, the requested firmware instructions may be specified according to an address space or file system of the remote firmware storage system. Additionally, or alternatively, the firmware instructions may be requested based on a unique filename or other identifier of the firmware instructions. For instance, the firmware access agent may in some cases maintain a mapping between different hardware logic components and unique identifiers corresponding to sets of firmware instructions, such that the firmware access agent requests different sets of firmware instructions by referencing their unique identifiers.

The present disclosure focuses on how firmware instructions for different hardware logic components are retrieved from a remote firmware storage system via a firmware access agent. However, as discussed above, the firmware access agent generally is implemented as, or otherwise includes one or more logic components, which in turn execute firmware instructions to provide the functionality of the firmware access agent. As such, in some examples, the firmware access agent itself executes agent-specific firmware instructions retrieved from a data storage component of the computing device. In the example of FIG. 1, firmware access agent 104 is communicatively coupled with a data storage component 120 storing agent-specific firmware instructions 122. For instance, the agent-specific firmware instructions may be stored in on-board read-only memory (ROM), an SPI flash chip, or other suitable local data storage component. In some examples, the agent-specific firmware instructions may be the only remaining set of firmware instructions still stored locally in the computing device, while firmware instructions for all other logic components are retrieved from the remote firmware storage system.

Figure 2:
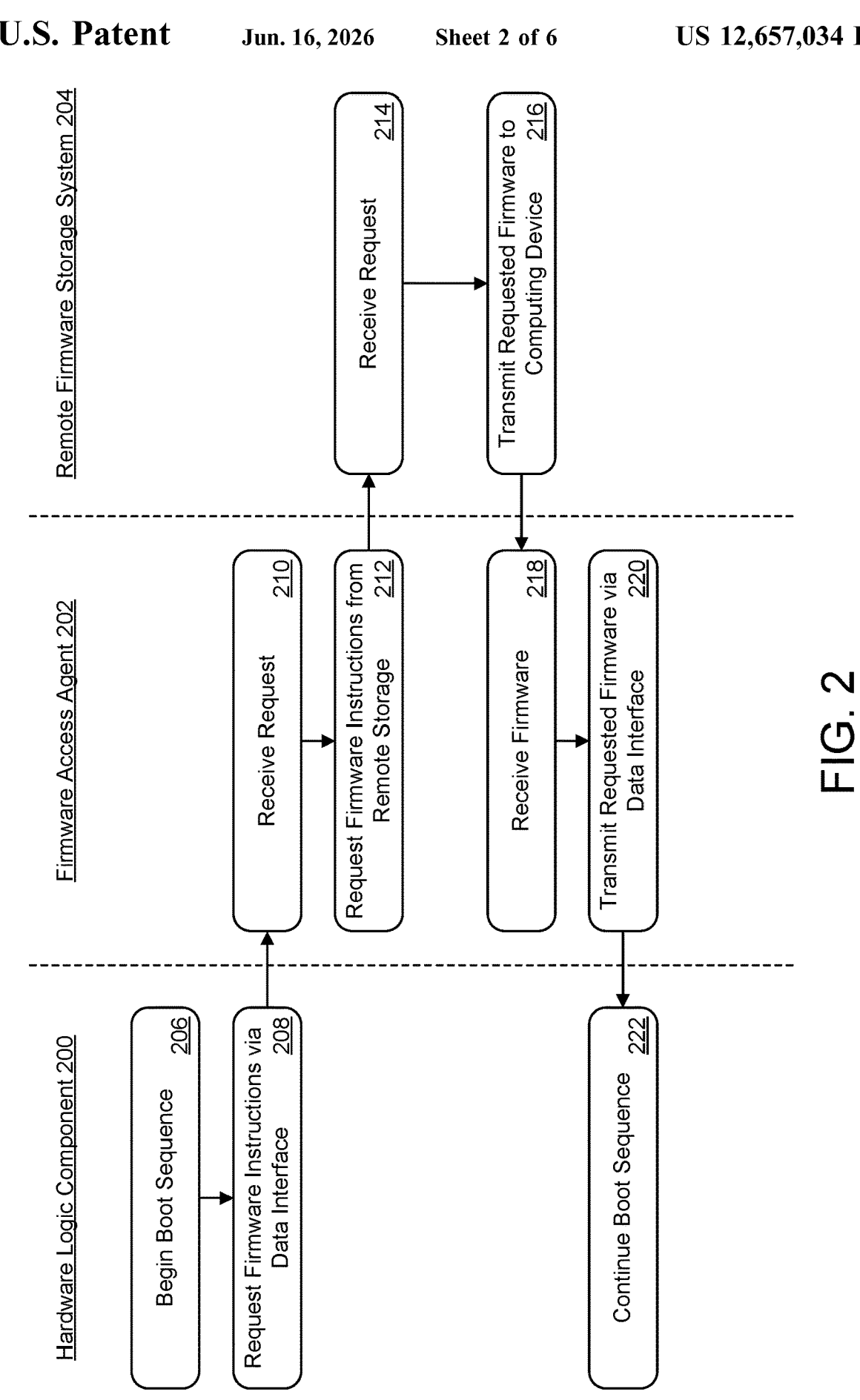
FIG. 2 illustrates data exchange between a hardware logic component, firmware access agent, and remote firmware storage system.

FIG. 2 illustrates exchange of data between a hardware logic component 200, a firmware access agent 202, and a remote firmware storage system 204. At 206, the hardware logic sequence begins a boot sequence. At 208, the hardware logic component requests firmware instructions via a data interface communicatively coupling the hardware logic component and the firmware access agent. For instance, as described above, the hardware logic component may output a predefined (e.g., hardcoded) memory address that would ordinarily correspond to the first line of its firmware instructions as stored in an on-board flash memory chip.

At 210, the firmware access agent receives the request for firmware instructions from the hardware logic component via the data interface. From there, at 212, the firmware access agent requests firmware instructions from the remote firmware storage system—e.g., by translating the request into network packets for transmission over a computer network.

At 214, the remote firmware storage system receives the request transmitted by the firmware access agent. The remote firmware storage system then retrieves the firmware instructions, and at 216, transmits the requested firmware instructions back to the firmware access agent. This is done in any suitable way depending on how the remote firmware storage system is implemented and organized. For instance, the firmware instructions may be retrieved from a folder or file system location corresponding to the specific type of hardware logic device requesting firmware instructions.

At 218, the firmware access agent receives the requested firmware instructions from the remote firmware storage system. The firmware access agent then at 220 transmits the firmware instructions to the hardware logic component. The firmware instructions are provided by the firmware access agent to the hardware logic component, such that the hardware logic component executes the firmware instructions and continues its boot sequence. For instance, the firmware instructions may be output on the data interface for execution by the hardware logic component, such that the hardware logic component is agnostic as to the presence of the firmware access agent. In other words, in some examples, the hardware logic component reads and executes the firmware instructions in a similar manner as would be done if the firmware was stored in an on-board flash memory chip. At 222, the hardware logic component executes the firmware instructions to thereby continue its boot sequence.

As discussed above, in some examples, the requested firmware instructions are retrieved by the firmware access agent from the remote firmware storage system. However, in some cases, the firmware access agent includes a cache used for storage of firmware instruction sets that have previously been retrieved. As such, in response to a particular request for firmware instructions, the firmware may in some cases be provided to the hardware logic component from the cache of the firmware access agent, rather than from the remote firmware storage system.

Figures 3A, 3B:
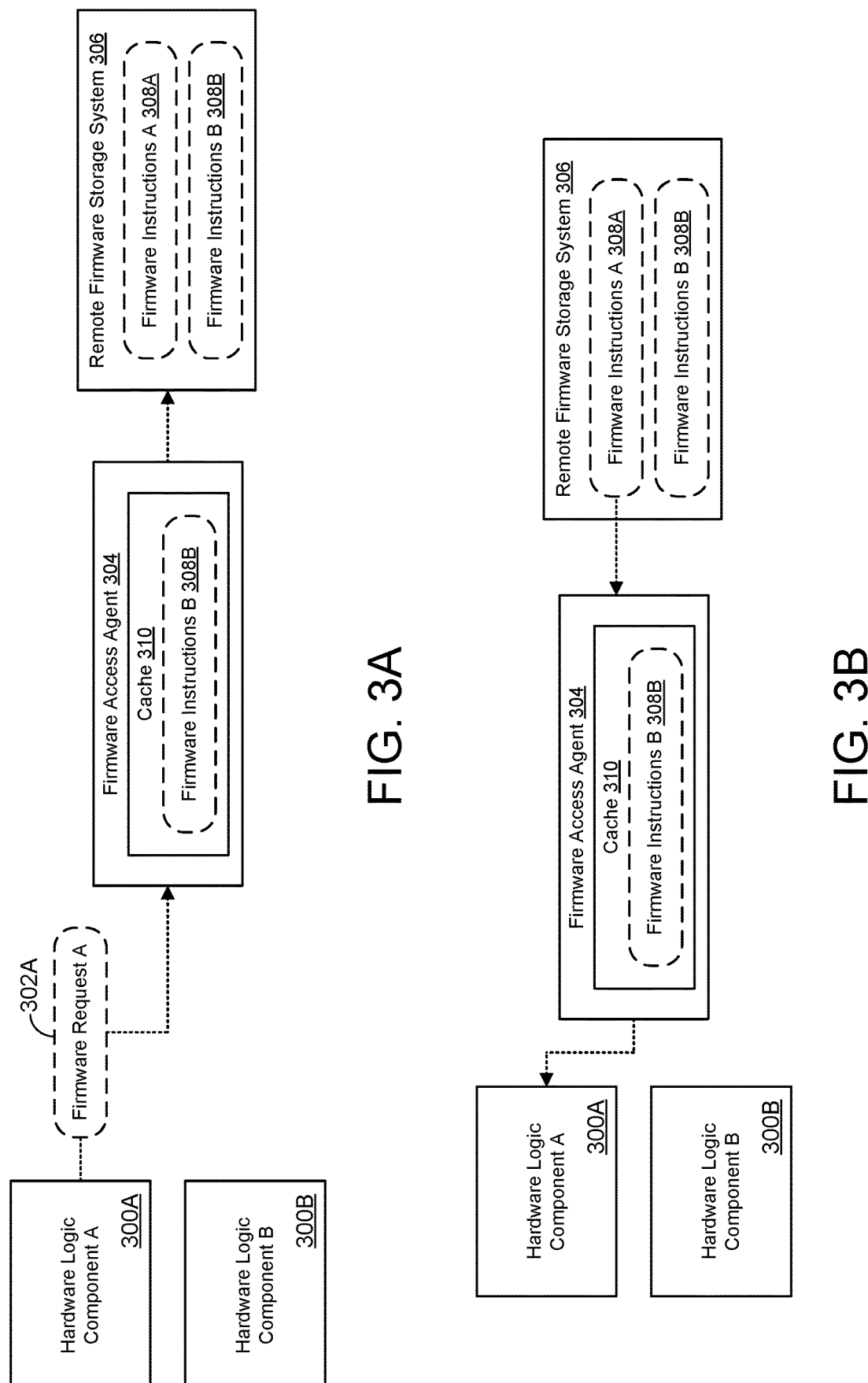
FIGS. 3A-3D schematically illustrate handling of different firmware read requests by a firmware access agent.
Figures 3C, 3D:
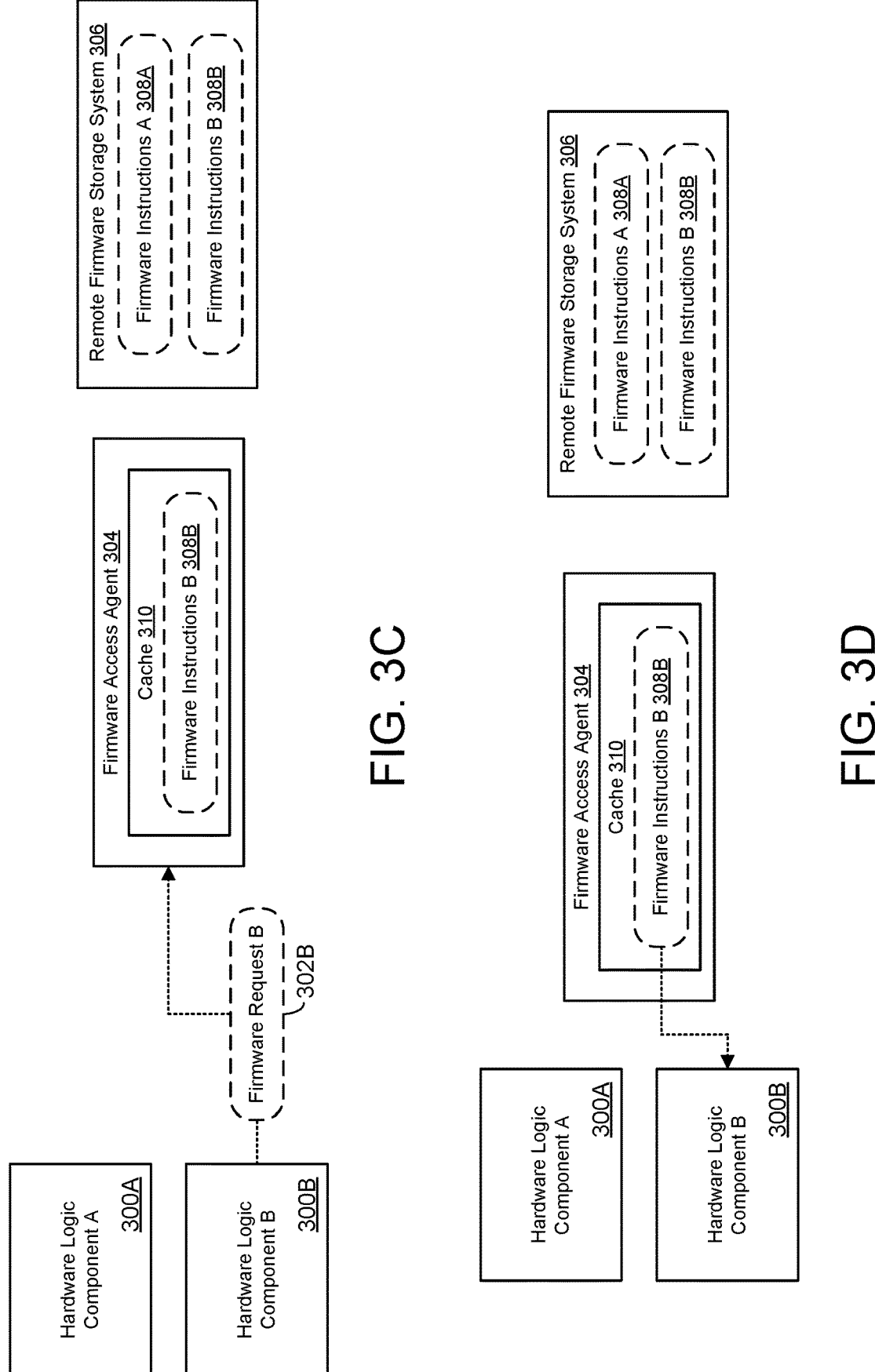

These two scenarios are schematically illustrated with respect to FIGS. 3A-3D. Specifically, FIG. 3A schematically shows two different hardware logic components 300A and 300B. Hardware logic component 300A transmits a firmware request 302A to a firmware access agent 304, which is communicatively coupled with a remote firmware storage system 306 (e.g., via a computer network). The remote firmware storage system 306 stores sets of firmware instructions 308A and 308B corresponding respectively to hardware logic components 300A and 300B. Additionally, firmware access agent 304 includes a cache 310, which in this example stores a copy of the firmware instructions 308B corresponding to hardware logic component 300B.

As such, in FIG. 3B, the firmware instructions 308A corresponding to hardware logic component 300A are retrieved from the remote firmware storage system, as they are not already stored in the cache of the firmware access agent. In other words, in this example, the firmware access agent satisfies the firmware request 302A by retrieving the requested firmware instructions from the remote firmware storage system.

FIG. 3C again schematically shows hardware logic components 300A/B, the firmware access agent 304, and the remote firmware storage system 306. In this example, the firmware access agent receives a second read request 302B for second firmware instructions from the second hardware logic component 300B. In this example, however, the requested firmware instructions 308B are already cached in cache 310 of firmware access agent 304. As such, in FIG. 3D, the firmware instructions 308B are provided to hardware logic component 300B directly from cache 310. In other words, because the firmware instructions are already cached, there is no need for the firmware access agent to retrieve the firmware instructions from the remote firmware storage system (e.g., because the firmware instructions were previously retrieved in response to an earlier firmware read request).

As discussed above, the present disclosure primarily focuses on cases where a hardware logic component transmits a firmware read request to the firmware access agent, and the firmware access agent responds by providing the requested firmware. In some examples, however, firmware logic components transmit firmware write and/or erase requests to the firmware access agent in addition to, or instead of, firmware read requests. In other words, in some examples, the firmware access agent receives a write request from a hardware logic component to modify a set of firmware instructions. The firmware access agent then transmits the write request for fulfillment by the remote firmware storage system.

Figure 4:
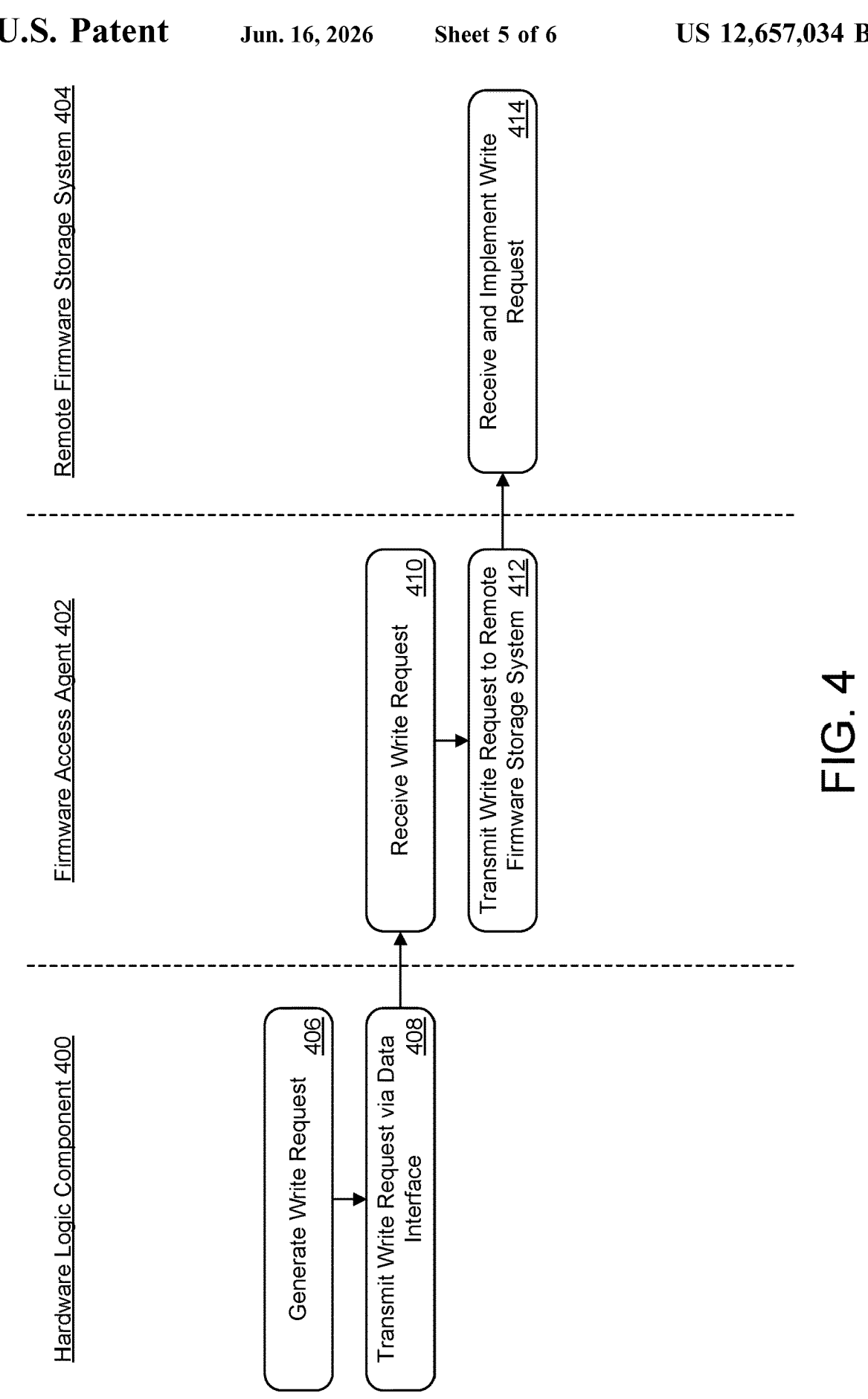
FIG. 4 illustrates another example data exchange between a hardware logic component, firmware access agent, and remote firmware storage system.

This is schematically illustrated with respect to FIG. 4. Specifically, FIG. 4 illustrates exchange of data between a hardware logic component 400, a firmware access agent 402, and a remote firmware storage system 404. At 406, the hardware logic component generates a write request, which is transmitted to the firmware access agent via the data interface at 408. As discussed above, a "write request" may take any suitable form depending on the implementation, and may specify any arbitrary changes, additions, and/or deletions to be made to a set of firmware instructions, or other suitable data, associated with the hardware logic component.

At 410, the firmware access agent receives the write request via the data interface. The firmware access agent then transmits the write request to the remote firmware storage system at 412. As discussed above with respect to FIG. 4, in some cases this may include converting or translating the write request into a format suitable for transmission to the remote firmware storage system, and that is interpretable by the remote firmware storage system. For instance, the write request may be expressed and transmitted as one or more network packets (or frames) for transmission via a computer network.

At 414, the remote firmware storage system receives and implements the write request. Again, the specific operations performed in response to the write request vary depending on the contents of the write request and on the specific implementation. In some examples, the remote firmware storage system may transmit any suitable data back to the firmware access agent upon receipt and/or successful fulfillment of the write request. For example, the remote firmware storage system may transmit back an acknowledgement, success indication, error message, and/or any other suitable data.

The methods and processes described herein may be tied to a computing system of one or more computing devices. In particular, such methods and processes may be implemented as an executable computer-application program, a network-accessible computing service, an application-programming interface (API), a library, or a combination of the above and/or other compute resources.

Figure 5:
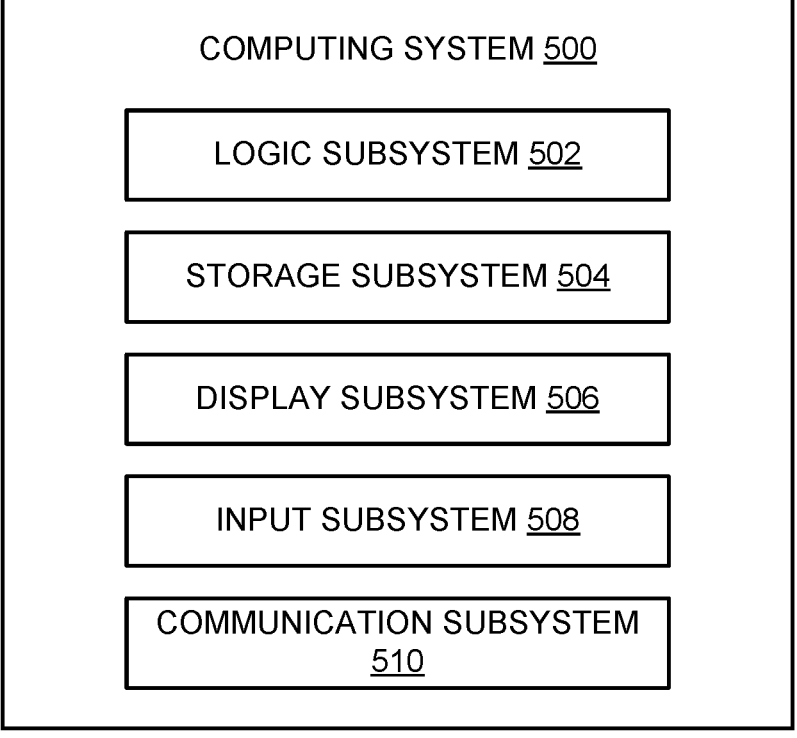
FIG. 5 schematically shows an example computing system.

FIG. 5 schematically shows a simplified representation of a computing system 500 configured to provide any to all of the compute functionality described herein. Computing system 500 may take the form of one or more personal computers, network-accessible server computers, tablet computers, home-entertainment computers, gaming devices, mobile computing devices, mobile communication devices (e.g., smart phone), virtual/augmented/mixed reality computing devices, wearable computing devices, Internet of Things (IoT) devices, embedded computing devices, and/or other computing devices.

Computing system 500 includes a logic subsystem 502 and a storage subsystem 504. Computing system 500 may optionally include a display subsystem 506, input subsystem 508, communication subsystem 510, and/or other subsystems not shown in FIG. 5.

Logic subsystem 502 includes one or more physical devices configured to execute instructions. For example, the logic subsystem may be configured to execute instructions that are part of one or more applications, services, or other logical constructs. The logic subsystem may include one or more hardware processors configured to execute software instructions. Additionally, or alternatively, the logic subsystem may include one or more hardware or firmware devices configured to execute hardware or firmware instructions. Processors of the logic subsystem may be single-core or multi-core, and the instructions executed thereon may be configured for sequential, parallel, and/or distributed processing. Individual components of the logic subsystem optionally may be distributed among two or more separate devices, which may be remotely located and/or configured for coordinated processing. Aspects of the logic subsystem may be virtualized and executed by remotely-accessible, networked computing devices configured in a cloud-computing configuration.

Storage subsystem 504 includes one or more physical devices configured to temporarily and/or permanently hold computer information such as data and instructions executable by the logic subsystem. When the storage subsystem includes two or more devices, the devices may be collocated and/or remotely located. Storage subsystem 504 may include volatile, nonvolatile, dynamic, static, read/write, read-only, random-access, sequential-access, location-addressable, file-addressable, and/or content-addressable devices. Storage subsystem 504 may include removable and/or built-in devices. When the logic subsystem executes instructions, the state of storage subsystem 504 may be transformed—e.g., to hold different data.

Aspects of logic subsystem 502 and storage subsystem 504 may be integrated together into one or more hardware-logic components. Such hardware-logic components may include program- and application-specific integrated circuits (PASIC/ASICs), program- and application-specific standard products (PSSP/ASSPs), system-on-a-chip (SOC), and complex programmable logic devices (CPLDs), for example.

The logic subsystem and the storage subsystem may cooperate to instantiate one or more logic machines. As used herein, the term "machine" is used to collectively refer to the combination of hardware, firmware, software, instructions, and/or any other components cooperating to provide computer functionality. In other words, "machines" are never abstract ideas and always have a tangible form. A machine may be instantiated by a single computing device, or a machine may include two or more sub-components instantiated by two or more different computing devices. In some implementations a machine includes a local component (e.g., software application executed by a computer processor) cooperating with a remote component (e.g., cloud computing service provided by a network of server computers). The software and/or other instructions that give a particular machine its functionality may optionally be saved as one or more unexecuted modules on one or more suitable storage devices.

When included, display subsystem 506 may be used to present a visual representation of data held by storage subsystem 504. This visual representation may take the form of a graphical user interface (GUI). Display subsystem 506 may include one or more display devices utilizing virtually any type of technology. In some implementations, display subsystem may include one or more virtual-, augmented-, or mixed reality displays.

When included, input subsystem 508 may comprise or interface with one or more input devices. An input device may include a sensor device or a user input device. Examples of user input devices include a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition.

When included, communication subsystem 510 may be configured to communicatively couple computing system 500 with one or more other computing devices. Communication subsystem 510 may include wired and/or wireless communication devices compatible with one or more different communication protocols. The communication subsystem may be configured for communication via personal-, local- and/or wide-area networks.

This disclosure is presented by way of example and with reference to the associated drawing figures. Components, process steps, and other elements that may be substantially the same in one or more of the figures are identified coordinately and are described with minimal repetition. It will be noted, however, that elements identified coordinately may also differ to some degree. It will be further noted that some figures may be schematic and not drawn to scale. The various drawing scales, aspect ratios, and numbers of components shown in the figures may be purposely distorted to make certain features or relationships easier to see.

In an example, a method for firmware access on a computing device comprises: at a firmware access agent of the computing device, receiving a read request for firmware instructions from a hardware logic component of the computing device, the read request generated as part of a boot sequence of the hardware logic component, and the read request received via a data interface communicatively coupling the hardware logic device and the firmware access agent; retrieving, via the firmware access agent, the firmware instructions from a remote firmware storage system separate from the computing device; and providing the firmware instructions from the firmware access agent to the hardware logic component via the data interface, such that the hardware logic component executes the firmware instructions and continues the boot sequence. In this example or any other example, the hardware logic component is one of two or more hardware logic components of the computing device, and wherein the firmware access agent stores separate sets of firmware instructions for each of the two or more hardware logic components from the remote firmware storage system. In this example or any other example, each of the two or more hardware logic components are communicatively coupled with the firmware access agent via different respective data interfaces. In this example or any other example, the data interface is associated with an interface identifier, and wherein the firmware instructions are retrieved from the remote firmware storage system based at least in part on the interface identifier. In this example or any other example, the interface identifier corresponds to one or more physical pins of the firmware access agent to which the data interface is connected. In this example or any other example, the firmware access agent includes a cache, and wherein the firmware instructions are retrieved from the remote firmware storage system based at least in part on a determination that the firmware instructions are not already stored in the cache. In this example or any other example, the cache is organized as two or more cache slices used for caching firmware instructions corresponding to two or more hardware logic components of the computing device. In this example or any other example, the method further comprises receiving a second read request for second firmware instructions from a second hardware logic component of the computing device, determining that the second firmware instructions are cached in the cache of the firmware access agent, and providing the second firmware instructions to the second hardware logic component from the cache. In this example or any other example, the firmware access agent itself executes agent-specific firmware instructions retrieved from a data storage component of the computing device. In this example or any other example, the method further comprises, at the firmware access agent of the computing device, receiving a write request to modify the firmware instructions from the hardware logic component, and transmitting the write request to the remote firmware storage system. In this example or any other example, the firmware access agent retrieves the firmware instructions from the remote firmware storage system over a computer network. In this example or any other example, the data interface is one of a serial peripheral interface (SPI), an enhanced serial peripheral interface (eSPI), a NAND flash interface, or a peripheral component interconnect express (PCIE) interface.

In an example, a computing device comprises: a hardware logic component; and a firmware access agent configured to: receive a read request for firmware instructions from the hardware logic component, the read request generated as part of a boot sequence of the hardware logic component, and the read request received via a data interface communicatively coupling the hardware logic device and the firmware access agent; retrieve the firmware instructions from a remote firmware storage system separate from the computing device; and provide the firmware instructions from the firmware access agent to the hardware logic component via the data interface, such that the hardware logic component executes the firmware instructions and continues the boot sequence. In this example or any other example, the hardware logic component is one of two or more hardware logic components of the computing device, and wherein the firmware access agent stores separate sets of firmware instructions for each of the two or more hardware logic components from the remote firmware storage system. In this example or any other example, the data interface is associated with an interface identifier, and wherein the firmware instructions are retrieved from the remote firmware storage system based at least in part on the interface identifier. In this example or any other example, the firmware access agent includes a cache, and wherein the firmware instructions are retrieved from the remote firmware storage system based at least in part on a determination that the firmware instructions are not already stored in the cache. In this example or any other example, the cache is organized as two or more cache slices used for caching firmware instructions corresponding to two or more hardware logic components of the computing device. In this example or any other example, the firmware access agent is further configured to receive a second read request for second firmware instructions from a second hardware logic component of the computing device, determine that the second firmware instructions are cached in the cache, and provide the second firmware instructions to the second hardware logic component from the cache. In this example or any other example, the firmware access agent itself executes agent-specific firmware instructions retrieved from a data storage component of the computing device.

In an example, a method for firmware access on a computing device comprises: at a firmware access agent of the computing device, receiving a read request for firmware instructions from a hardware logic component of the computing device, the read request generated as part of a boot sequence of the hardware logic component, and the read request received via a serial peripheral interface (SPI) bus communicatively coupling the hardware logic device and the firmware access agent; retrieving, via the firmware access agent, the firmware instructions from a remote firmware storage system separate from the computing device; providing the firmware instructions from the firmware access agent to the hardware logic component via the data interface, such that the hardware logic component executes the firmware instructions and continues the boot sequence; at the firmware access agent, receiving a second read request for second firmware instructions from a second hardware logic component of the computing device, the second read request received via a second SPI bus communicatively coupling the second hardware logic device and the firmware access agent; and providing the second firmware instructions to the second hardware logic component via a cache of the firmware access agent.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method for firmware access on a computing device, the method comprising:

at a firmware access agent of the computing device, receiving a read request for firmware instructions from a hardware logic component of the computing device, the read request generated as part of a boot sequence of the hardware logic component, and the read request received via a data interface communicatively coupling the hardware logic device and the firmware access agent;

retrieving, via the firmware access agent over a computer network, the firmware instructions from a remote firmware storage system of a remote server computing device that is separate from the computing device, wherein the computer network includes at least one of a local area network (LAN) and a wide area network (WAN); and providing the firmware instructions from the firmware access agent to the hardware logic component via the data interface, such that the hardware logic component executes the firmware instructions and continues the boot sequence.

2. The method of claim 1, wherein the hardware logic component is one of two or more hardware logic components of the computing device, and wherein the firmware access agent retrieves separate sets of firmware instructions for each of the two or more hardware logic components from the remote firmware storage system.

3. The method of claim 2, wherein each of the two or more hardware logic components are communicatively coupled with the firmware access agent via different respective data interfaces.

4. The method of claim 1, wherein the data interface is associated with an interface identifier, and wherein the firmware instructions are retrieved from the remote firmware storage system based at least in part on the interface identifier.

5. The method of claim 4, wherein the interface identifier corresponds to one or more physical pins of the firmware access agent to which the data interface is connected.

6. The method of claim 1, wherein the firmware access agent includes a cache, and wherein the firmware instructions are retrieved from the remote firmware storage system based at least in part on a determination that the firmware instructions are not already stored in the cache.

7. The method of claim 6, wherein the cache is organized as two or more cache slices used for caching firmware instructions corresponding to two or more hardware logic components of the computing device.

8. The method of claim 6, further comprising receiving a second read request for second firmware instructions from a second hardware logic component of the computing device, determining that the second firmware instructions are cached in the cache of the firmware access agent, and providing the second firmware instructions to the second hardware logic component from the cache.

9. The method of claim 1, further comprising, at the firmware access agent of the computing device, receiving a write request to modify the firmware instructions from the hardware logic component, and transmitting the write request to the remote firmware storage system.

10. The method of claim 1, wherein retrieving the firmware instructions from the remote firmware storage system over the computer network includes:

at a communication interface of the computing device, receiving a firmware request from the firmware access agent;

packetizing the firmware request into one or more network data packets;

transmitting the one or more network data packets over the computer network to the remote server computing device; and receiving the firmware instructions over the computer network from the remote server computing device.

11. The method of claim 1, wherein the computing device is one of two or more computing devices serviced by the remote firmware storage system, such that the remote firmware storage system stores respective sets of firmware instructions accessible to each of the two or more computing devices.

12. The method of claim 1, wherein the computer network includes the WAN.

13. A computing device, comprising:

a hardware logic component; and a firmware access agent configured to:

receive a read request for firmware instructions from the hardware logic component, the read request generated as part of a boot sequence of the hardware logic component, and the read request received via a data interface communicatively coupling the hardware logic device and the firmware access agent;

retrieve the firmware instructions over a computer network from a remote firmware storage system of a remote server computing device that is separate from the computing device, wherein the computer network includes at least one of a local area network (LAN) and a wide area network (WAN); and provide the firmware instructions from the firmware access agent to the hardware logic component via the data interface, such that the hardware logic component executes the firmware instructions and continues the boot sequence.

14. The computing device of claim 13, wherein the hardware logic component is one of two or more hardware logic components of the computing device, and wherein the firmware access agent retrieves separate sets of firmware instructions for each of the two or more hardware logic components from the remote firmware storage system.

15. The computing device of claim 13, wherein the data interface is associated with an interface identifier, and wherein the firmware instructions are retrieved from the remote firmware storage system based at least in part on the interface identifier.

16. The computing device of claim 13, wherein retrieving the firmware instructions from the remote firmware storage system over the computer network includes:

at a communication interface of the computing device, receiving a firmware request from the firmware access agent;

packetizing the firmware request into one or more network data packets;

transmitting the one or more network data packets over the computer network to the remote server computing device; and receiving the firmware instructions over the computer network from the remote server computing device.

17. The computing device of claim 13, wherein the computer network includes the WAN.

18. A method for firmware access on a computing device, the method comprising:

at a firmware access agent of the computing device, receiving a read request for firmware instructions from a hardware logic component of the computing device, the read request generated as part of a boot sequence of the hardware logic component, and the read request received via a serial peripheral interface (SPI) bus communicatively coupling the hardware logic device and the firmware access agent;

retrieving, via the firmware access agent over a computer network, the firmware instructions from a remote firmware storage system of a remote server computing device that is separate from the computing device, wherein the computer network includes at least one of a local area network (LAN) and a wide area network (WAN);

providing the firmware instructions from the firmware access agent to the hardware logic component via the data interface, such that the hardware logic component executes the firmware instructions and continues the boot sequence;

at the firmware access agent, receiving a second read request for second firmware instructions from a second hardware logic component of the computing device, the second read request received via a second SPI bus communicatively coupling the second hardware logic device and the firmware access agent; and providing the second firmware instructions to the second hardware logic component via a cache of the firmware access agent.

19. The method of claim 18, wherein retrieving the firmware instructions from the remote firmware storage system over the computer network includes:

at a communication interface of the computing device, receiving a firmware request from the firmware access agent;

packetizing the firmware request into one or more network data packets;

transmitting the one or more network data packets over the computer network to the remote server computing device; and receiving the firmware instructions over the computer network from the remote server computing device.

20. The method of claim 18, wherein the computer network includes the WAN.

* * * * *